Dec. 29, 1931.                J. H. MILLER                1,839,043
                          SAUSAGE LINKING MACHINE
                         Filed June 6, 1930       8 Sheets-Sheet 3

Inventor
Joseph H. Miller
by Connolly Bros
Attorneys

Dec. 29, 1931.    J. H. MILLER    1,839,043
SAUSAGE LINKING MACHINE
Filed June 6, 1930    8 Sheets-Sheet 5

Inventor
Joseph H. Miller
By Connolly Bros.
Attorneys

Dec. 29, 1931.  J. H. MILLER  1,839,043
SAUSAGE LINKING MACHINE
Filed June 6, 1930  8 Sheets-Sheet 6

Dec. 29, 1931.   J. H. MILLER   1,839,043
SAUSAGE LINKING MACHINE
Filed June 6, 1930   8 Sheets-Sheet 7

Dec. 29, 1931.  J. H. MILLER  1,839,043
SAUSAGE LINKING MACHINE
Filed June 6, 1930  8 Sheets-Sheet 8

Inventor
Joseph H. Miller
By Connolly Bros.
Attorneys

Patented Dec. 29, 1931

1,839,043

UNITED STATES PATENT OFFICE

JOSEPH H. MILLER, OF SAN DIEGO, CALIFORNIA

SAUSAGE LINKING MACHINE

Application filed June 6, 1930. Serial No. 459,463.

This invention has relation to the manufacture of sausages of that character in which the stuffed or filled casings of many feet in length are divided into individual sausages and formed into connected links by twisting the integument constituting the casing at intervals corresponding to the desired length of the sausages and thus producing a chain of connected sausages which may be then transferred to a smoke-house and afterwards separated or severed from the rest of the chain according to the requirements of the dealer and user.

The object of the invention is to provide a novel method and apparatus for the production of link sausages, in which several operations are automatic, expeditious, economical and of such a character that the production of the linked sausages may be performed on an extensive scale.

It has been heretofore customary in the manufacture of sausages to form the same into links by slow and tedious methods, which contemplated the formation of such sausages separately by stuffing or filling a sufficient length of the casing to constitute a sausage, and thereafter twisting the filled portion at its point of connection with the casing.

This operation has generally been performed by hand and has been found to be slow and uncertain and consequently not adapted to the manufacture of linked sausages on an extensive scale.

The object of the present invention is to provide a method and means for the expeditious production of linked sausages on an extensive scale and to effect the formation of stuffed or filled casings into connected links such method and means being automatic and of such a character that many casings may at a time be reduced to separable, connected links, and during one continuous operation made into complete chains of links, and so disposed of as to be in condition for transfer to the smoke-house without further treatment.

The invention is carried into effect by means of a machine or apparatus embodying a supporting structure or frame, in which there is provided a device in the nature of a tubular conduit arranged at an angle or inclination, into and through which the filled casing is passed through an opening in the upper end and thence downward through a series of tubular guides which ensure the proper retention of the unlinked and encased sausage during its passage and treatment to the outlet of the tubular housing, wherein the links are produced.

This tubular conduit is divided longitudinally into two sections or members hinged together and having meeting surfaces on a diametrical plane, and provided with interlocking means located opposite the hinges.

The interior of the tubular conduit is generally of cylindrical form and within its bore there are fitted a series of drums, which are rotatable therein, their bearings being the inner surfaces of the conduit.

Within each drum and secured thereto a short tube is mounted, and through such tubes the stuffed sausage length is passed and guided.

The several drums are in axial alignment and are arranged and adapted to be rotated in succession. Each drum is equipped with mechanism to measure off and divide from the main length of the sausage a sufficient length or portion to form a single sausage unit, and is also provided with means for clamping each such length or measured portion, compressing the sausage at a point for twisting and then twisting the clamped sausage unit to form the usual connecting neck without twisting or moving the filled casing above this neck.

The arrangement and operation is such that each sausage unit is individually segregated from the main body or length of stuffed casing, and given the necessary twist to form a neck at its point of connection, and that the several sausages are given this twist in succession from the lower to the upper end of the conduit or trough.

The length of stuffed casing is fed through the trough and link forming devices by gravity; and as the linked units are caused to leave the link forming devices, they are passed through a tube and deposited in parallel lines on a tray, which when filled is transformed to the smoke-house or other depository.

This tray is associated with mechanism constituting an important feature of the invention, which is so constructed and arranged that the tray is given a reciprocatory movement lengthwise to promote the deposit therein of the linked sausages in parallel lines or rows, and also is given a lateral movement so as to space the rows or lines, apart, and insure an orderly and compact disposition of the same.

In its complete form and equipment the invention embraces features by which a large number of individual units may be operated at a time by co-acting and co-related connections, so that the production of many chains of linked sausages may be effected at a time and during a given period.

With the objects in view as herein recited, the invention consists in the novel construction and combination of elements for carrying into effect the operation before described.

In the accompanying drawings illustrating a preferred embodiment of the invention:

Fig. 1 is a side elevation of the machine as a whole.

Fig. 1$^a$ is a fragmentary view partly in section, of the upper part of the chute or trough.

Fig. 2 is a central longitudinal section of a part of the chute and its internal equipment.

Figs. 2$^a$ and 3$^a$ are transverse sections on the lines 2$^a$ and 3$^a$ respectively of Fig. 2, looking in the direction of the arrows.

Figs. 11 and 11$^a$ are fragmentary views in elevation of the link forming drum.

Fig. 16 is a plan view of the tray operating mechanism.

The reference numeral 2, designates the main frame of the apparatus which may be constructed in any suitable manner of uprights, cross beams and braces.

Upon the frame 2 is supported the main chute or trough, 2$^a$, within which the several operations incidental to the production of the sausage links are carried on.

This trough or chute, is an elongated metallic structure composed of two members, 3 and 4 respectively, which are hinged together, as shown at 5, at one edge of a diametrical plane on which the two members meet when closed together.

These members are adapted to be opened and closed, and are provided with levers, 6, mounted on the stationary member 4, between lugs 7—7, and adapted to engage with beveled blocks 8 attached on the outer surface of the hinged movable member 3, when the chute is closed. The interior of the chute is of general cylindrical form, and its inner walls form bearings for the drums within which the sausage holding, twisting and link-forming devices are mounted.

Except as hereinafter specified the drums are all of similar structure and equipment. As many of such drums as may be needed are fitted within the chute and are rotatable, such rotation being produced from the operation of suitable crank or motor shaft 8$^1$, located at the lower end of the chute or trough.

This shaft 8$^1$, which rotates in a bearing, is threaded, and its threaded portion engages with a threaded bearing 11, in a part of the main frame so as to move lengthwise on being rotated. The upper end of the shaft 8$^1$ is attached to the base of a special drum 12, arranged within the chute so that as the shaft rotates, the drum 12 will also rotate, and will accordingly be moved upward.

Within the cylinder or drum 12 is fitted a diametrically positioned bar 13, resting on the base of the drum 12. The drums, through the rotation of which the twisting of the stuffed casing or cord, is effected, are designated generally by the numerals 3$^1$—4$^1$, applied respectively to the two members of which said drum is composed.

They are arranged in serial order one above the other and are disconnected from each other except as hereinafter detailed.

Referring to the lowermost of these drums, it will be seen that it carries on its base portion a pair of pivotally suspended blocks or tongues 16, which are arranged so as to be free to move in one direction, but are prevented from moving in the other direction.

When, by the operation of the shaft 8$^1$, the drum or cylinder 12 is turned and consequently moved upwardly, a certain distance, the bar 13 will come in contact with the tongues 16 and through them, impart rotation in one direction to the adjacent drum 3$^1$—4$^1$, and as will be presently explained, this drum will subsequently communicate similar rotating movement to the next drum above, and the latter will in turn communicate similar motion to the third drum and so on until all the drums are caused to rotate in unison.

Referring again specially to the lowermost drum $3^1$—$4^1$ and the succeeding drum, it will be convenient and desirable to explain the interior construction and equipment of these two drums as illustrative and explanatory of the other drums and their equipment.

As will be seen, the drums consist each of two semi-cylindrical halves $3^1$—$4^1$ hinged together at one side of a diametrical plane so that one may be lifted on its hinges a certain distance, and by means hereinafter described, locked at such position.

The numeral 17 designates a short tube located in the section $4^1$ of each drum and of a size to allow the stuffed sausage casing to pass freely therethrough so that the trough or chute may have fed into it a sufficiently long section of sausage stock to form a number of sausages. Other guards to prevent displacement of the sausages may be located at points between the tubes 17, as will be described presently.

Each drum is of a length corresponding to the desired length of a single sausage or unit, and near the upper end of each drum section $4^1$ a pivoted lever 18 is mounted, and so positioned that the blade 19, carried thereby shall, when the drum is open, be above that portion of the casing where it is desired to form and twist the neck or joint. This lever is normally held in position above or to one side of the sausage cord and when the drum is closed its blade 19 is pressed down upon the cord, thus producing a closed seam or flattened portion, which separates the contents of one sausage unit from the cord above and produces an untwisted neck.

This action of the lever and blade is produced by means of a bifurcated lever $19^1$ mounted on the section $3^1$, of the drum. When the relatively movable section or half of the drum is closed down upon the other section $4^1$, the lever $19^1$ comes in contact with studs 20, projecting from the sides of the blade lever 18, and forces the blade down upon the filled casing as before mentioned. It will be noted that the bifurcated lever $19^1$ is of a tapering form and that, after depressing the lever 18, its beveled or oblique lower edge, slips past the studs 20 on the lever 18 and releases the latter from positive pressure so that it may rise when the conduit or chute, is opened and the two members of the drum parted at their free edges.

When this parting of the drum members takes place, the lever $19^1$, which is mounted on the swinging member $3^1$ of the drum, is lifted therewith above the blade, and swung out of the path of the latter.

The blade bar or lever, 18, is, as will be seen, mounted on a post $19^2$, secured to the relatively stationary member $4^1$ of the drum, and is movable lengthwise of the post, $19^4$, so as to respond to pressure from the lever $19^1$, springs $20^a$ being mounted on the post $19^4$, to hold the lever 18 in yielding restraint and in proper position relatively to the other elements with which it co-operates.

As will be understood from the preceding description and will be further and more fully explained, the filled sausage casing which may be briefly defined as a "cord", is fed into the chute or conduit, through the top opening and to or out of the lower end of the chute thus passing through the central cavities of all the drums. While the cord or casing is being passed through the chute and drums, both of these members are open, that is the movable section of the chute is swung outward, and with it the section $3^1$ of each drum carrying the levers $19^1$, while the other member $4^1$, remains stationary.

The lower or inner section, 4 of the chute or conduit, is permanently fixed in position. The drum member to which is attached the short tubes, and which carries the dividing blade, is held in locked position by means of a stud 22 on the lever 6, which passes through a hole 23, in the stationary member of the chute and enters a socket 24, in the wall of the drum section $4^1$, which is to be held stationary when the chute and drums are in open position.

When the chute and drums are closed, and the drum sections $4^1$ are released from engagement of the studs 22, the position of the socket in the drum member $4^1$ is such that the stud 22 can only be engaged with the member $4^1$ of the drum when the drum is in such position relatively to the chute that the plane or parting surface of the drum members are coincident with the planes of the parting edges of the chute sections.

It will be understood therefore that the drums cannot be turned or relatively displaced when the chute and drums are open. It will also be seen that when the chute is closed and with it the drums, the latter are free to turn and perform their intended functions. The member $3^1$ of the drum is notched at $4^a$, for the engagement of latch $4^b$, pivoted to the chute member $4^1$, so that when the chute is opened the member $3^1$ will be raised. This latch is disengaged from the member $3^1$ when the chute is closed, by the block $4^d$ acting against the lower end of the latch.

It is now to be explained and understood that the apparatus so functions that each sausage unit or link, when segregated from the cord or length of casing, and a neck formed at the twist part, is separately treated, that is turned or twisted on its longitudinal axis, but without turning the line or cord from which the link is to be separated or twisted. Now assuming that the chute has been supplied with a length of sausage cord not yet formed into links, and that the conduit or chute has been closed and with it the drums, the operating shaft is then turned in the direction to move the drum 12, at the lower end of the chute, upward, until it engages with the lowermost drum $3^1$—$4^1$ of the series, and imparts rotary motion thereto. At this period the first sausage link has been segregated from the main cord or length and being clamped within the lowermost drum, is turned on its axis and given the requisite twisted neck.

At the same time the untwisted links have been formed in all the drums, but these drums remain stationary until the first twist has been produced.

It is now to be explained that during the initial rotation of the first or lowermost drum, the latter moves upward under the propelling action of the operating shaft until it engages with the next drum and imparts rotary movement thereto, so that it will in turn function as did the first drum, and twist the sausage link held therein. It is to be understood, and as is made clear by the drawings, that when the first operation of twisting takes place, the drums are spaced apart longitudinally, and are not in any way operatively connected with each other.

Accordingly, when the first drum is rotated all the others remain stationary and the first link is produced independently of the others. When, as explained, the first drum has engaged the second drum and the latter rotates, the link in the first drum is turned with the latter, but as it turns in unison with the second drum and its contained link, no further twist is produced in the first link.

As in the case of first drum the second drum is also moved upward, the upward movement of the first drum being continued.

The procedure is the same with each drum in succession, the line or chain of sausage links being gradually shortened by the formation of the twisted neck, as the drums gradually come together and shorten their line.

The engagement of each drum with the next drum above is produced as follows:

Each drum is constructed with a contracted cylindrical portion $3^a$, at its lower end, and is provided at its wider continued cylindrical part with a depending block $3^b$, while the wall of the wider portion of the drum is formed with a recess at its upper end, in which is pivotally seated a bar $4^a$, which projects above its seat. As a drum moves upward while being rotated, the bar $4^a$ comes in contact with the block $3^b$, and through the same rotates the drum to which this block $3^b$ is attached. The block $3^b$ and the bar $4^a$ are adapted for sliding engagement with each other, and are beveled as shown, so that should the two elements meet at their ends, the pivotal element $4^a$ will be pressed downward so as to pass the end of the stationary member $3^b$ and then rise, slightly resisted by the spring 25, and reach the proper position of engagement with the block $3^b$.

As the several drums are in axial alignment, and are relatively movable longitudinally in relation to each other, provision is made for the use of yielding coupling means which will permit of the expansion and contraction of the train or series of drums and to fully incase the sausages within the drums at the twisting points.

For the purpose stated each drum has attached to and rising from, its upper surface, at a distance from its edge, a pair of semi-cylindrical walls 28, 29, respectively, which are projected inwardly and downwardly from their upper edges, while attached to the lower surface, near its outer edge, is a similar structure, but reversed. These structures as will be seen are in vertical sections of rectangular L-shape and are hooked together so as to be incapable of lateral disconnection, while being free to move relatively in an axial as well as circumferential direction. When these devices are in the coupled positions shown, the drums may be brought towards, or moved away from each other without producing open joints or seams. The relative axial movement of the drums is limited by the transverse connecting webs between the semi-cylindrical walls.

Attention is now called to certain structural features within the drum, which have not been heretofore explicitly described.

Reference has been made to the short tubes 17 through which the untwisted sausage cord or integument, passes. These tubes are located as shown, one at the upper end of each drum. Between these tubes there is located in each drum a metallic U-shaped trough 30, in which the sausage cord or filled casing rests, and above this trough there is arranged a closure or pressure bar 31, which forms a lid or top to the trough. This bar is slidably mounted on pins or posts, 32, encircled by springs 33, located between the bars and the inner wall of the swinging drum member, so that the bar 31, has a spring restrained movement. This bar is adapted and intended to rest on the sausage or sausages, to clamp and hold them in proper position and prevent any displacement.

One of the walls or sides of the trough is higher than the other so that the bar will lie in an inclined position as shown, and rests at one side upon the edge of the shortened wall. This bar is brought into use when the drums and trough are closed and, in connection with the walls of the trough embrace the sausages in place against undue turning or other displacement, when they are being formed into link units. As will be seen the space between the trough of one drum and the short tube above the same is open so that the segregating blade may be operated and the twist produced by the turning of one drum and its enclosed sausage unit or link, while the drums above with their sausage contents remain stationary.

When all the drums have been rotated and the sausage material made into links, the trough and drums are opened and the sausages released from the grip of the bars 31, will slide downward by gravity and pass through a hole 34 in the bottom of the lowermost drum, and into an outlet tube 35, through which they will pass to a suitably located tray. This outlet tube has a downward inclination and terminates at its lower end in a short substantially vertical, portion 40.

As it is desirable that the sausages should be laid lengthwise of the receiving tray, the lower end of the outlet tube is provided with a pivotally hung nozzle 41, having a tapered form so that the outcoming links will strike the inclined surface of the nozzle and will slightly cant it so that the sausage will issue therefrom slightly out of vertical line and be deposited on the tray flatwise and in a uniform direction.

As before indicated the sausages are deposited systematically in parallel rows on a receiving tray for transportation to the smoke-house. This tray, designated by the numeral 45, is an elongated rectangular structure and has vertical holes or grooves, 48, in its side bars to receive the dowel pins 49 of a tray holding frame 49¹, of similar form and size. The tray 45 being detachable from frame 49¹. The latter is mounted on a wider frame 50 which is provided with wheels 51, arranged and adapted to travel on the tracks 52 attached to the main frame of the machine.

An endless sprocket chain 53, is carried by sprocket wheels 54, 55, on horizontal shafts 56, 56', journaled on the main frame, and the shaft 56 is driven by suitable pulley and belt equipments and associated with belt shafting mechanism whereby the chain may be driven alternately in opposite directions. This chain is attached at 53ª to the frame.

The frame 49¹ has attached to one side the flexible connections 57¹, which pass over pulleys 58, mounted on the main frame at one side thereof and carrying weights 59 by which a lateral pull is imposed on the frame 49¹.

At each end of the frame 49¹ a pin 60 projects downwardly from the under side of the frame, between the cross bars 61—62 at each end of the wide frame. The frame 49¹ is arranged and adapted to move sidewise under the pull of the weights 59, and is also arranged and adapted to move a measured distance longitudinally in two directions, the extent of lateral movement being limited to the length of the space between the end bars 61—62 of the wide frame, 50.

These end bars carry the horizontal pins 61ª, 62ª, in alternate order as shown, and these pins serve as stops to the lateral movement of the tray and tray holder under the following described conditions:

Assuming that the tray holder is at the limit of its horizontal movement in one direction, say to the left, and that it is at the limit of its lateral movement on one side. At this position the pin 60 projecting downward from the tray holder is between the side bar of the tray holder and the first horizontal pin 61ª projecting inwardly from the end bar of the wide frame 50, the latter being under longitudinal movement in the direction of the arrows in Fig. 16. As the frame 50 continues to move and at the end of its travel the end of the tray holder 49¹ will eventually strike the cross bar 65, attached to the main frame and its movement will be arrested, the movement of the wide frame being continued. There will thus be produced a relatively backward movement of the tray holder which will disengage the vertical pin 60 from contact with the adjacent horizontal pin at the end of the wide frame or carriage at each end of the latter. The tray frame will then, under the influence of the weights, be pulled to one side a short distance, and its further movement will be impeded by the pins projecting horizontally inward from the second cross bar of the carriage.

It is to be noted that when the tray holder is in its most forward position at one end, and is travelling in a corresponding direction, the downwardly projecting pin 60 is located between the nearest horizontal pin projecting inwardly from the extreme end cross bar of the carriage. The other end of the tray holder is then at its most inward position, and the vertical pin at that end is now on the opposite side of the space between the end bars at the corresponding end of the carriage, so that in the longitudinal shifting movement of the tray holder, the downwardly projecting pin is opposed to the horizontal pins projecting from the second cross bar of the carriage and is released therefrom by the forward travel of the tray holder.

As will be seen, the tray holder is released from its impeding horizontal pin at each end simultaneously. The tray holder being thus released at both ends, will now be pulled to one side until each vertical pin strikes the next horizontal pin in its path whereby further lateral movement of the tray is prevented. While the carriage with the tray holder and tray are moving in one direction longitudinally, the sausages will be deposited on the tray in a straight line, and when the lateral shifting of the tray and tray holder takes place the line or chain of sausages is bent at a linked point and, as the tray holder and tray are then reversed in longitudinal movement, the next layer or line of sausages will be deposited on another course and so on until the tray has been filled with linked sausages lying in parallel lines.

The alternate to and fro movement of the carriage is produced by the shifting of the pulley belt from one pulley to the other.

Mechanism for shifting belts to produce reciprocating motion of a work carriage in machinery, is well known and in common use, and as I make no claim to any special mechanism for this purpose the same need not be described.

It may be here noted that in utilizing the machine, the sausage stock or filled cord, which is generally a section of the entrails or gut, of an animal, and constitutes a casing, is dropped into the trough at its upper end and slides downward to the other end while the chutes and drums are open which position may be maintained by any suitable devices. After the stock or casing is in position the drums and chutes are closed and the machine put in operation to perform the functions heretofore described. After the linking is completed, the chute and drums are reopened and the chain of links allowed to emerge from the chute to be deposited in the tray, which they do by gravity solely.

The chute and drums are then closed and by the reverse movement of the operating shaft the drums are restored to their normal positions for the reception of another charge, it being noted that the uppermost drum is locked against vertical movement by studs 80 and grooves 81, on the trough and drum respectively.

The instrumentalities so far described have been those constituting a single unit, adapted to perform all the functions incident to the formation of a series or chain, of links in a single length of unlinked stock, and the deposit of the chains or linked portions on a single receiving tray, the latter being given a certain movement or series of movements for the purposes heretofore described.

Inasmuch however, as the main object of the invention is to provide means for the production of linked articles on an extensive scale and in the most expeditious and economical manner I have devised and proposed a construction and mode of operation of the units. whereby a large number of such units may be assembled as a plane or gang with the conveyers or chutes arranged in parallel relation and operated from a single source of power.

Figures 1, 1A:
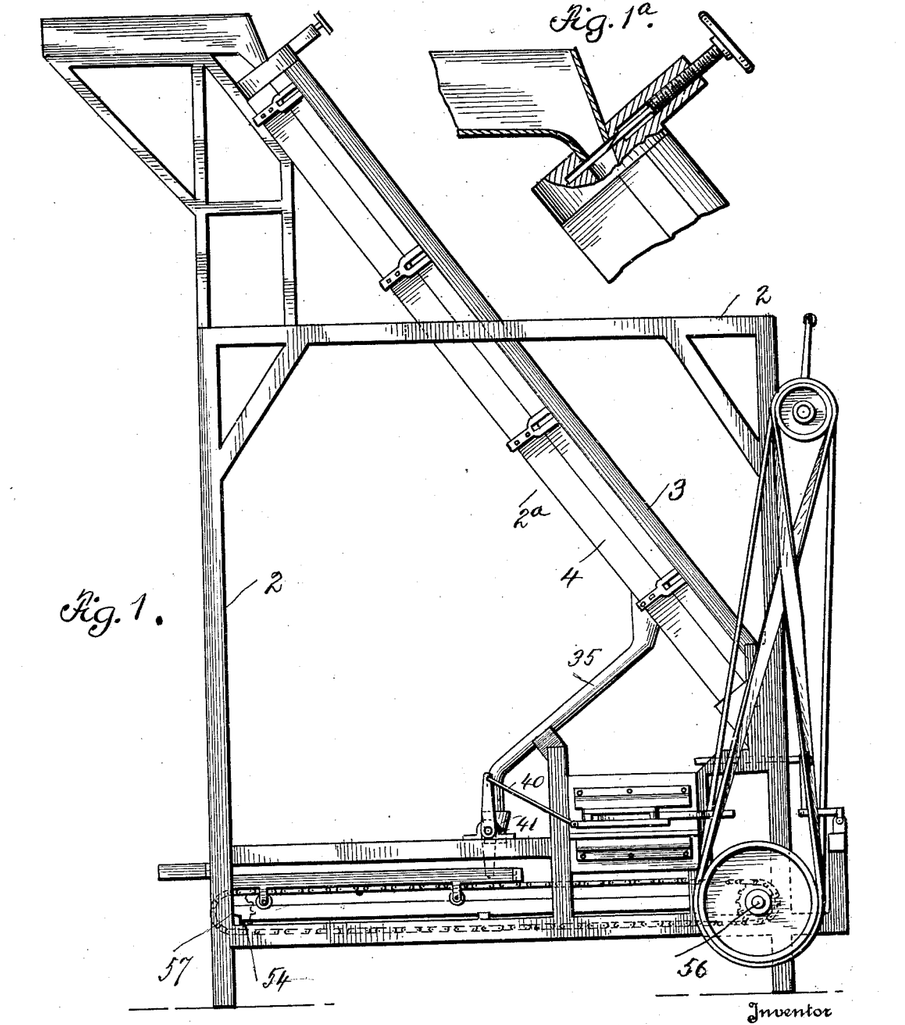
Figures 2, 2A, 3A:
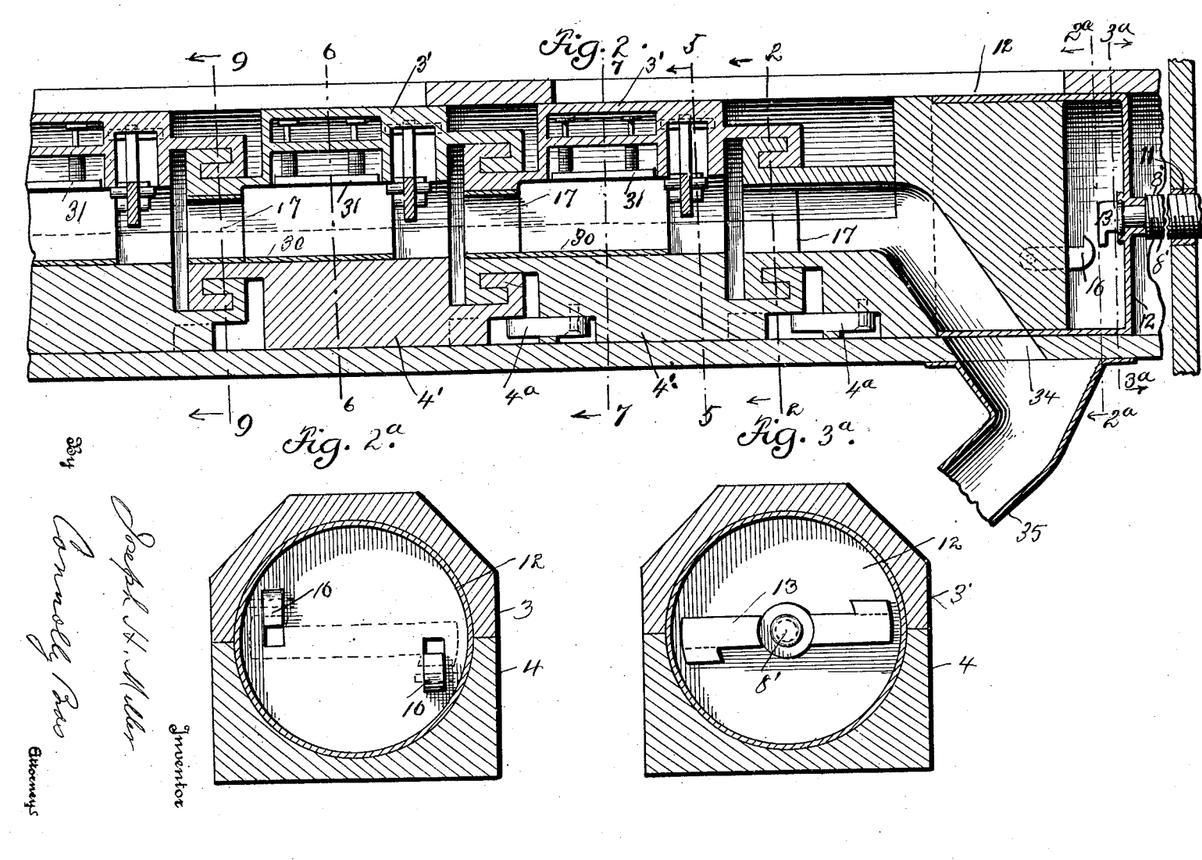
Figure 4:
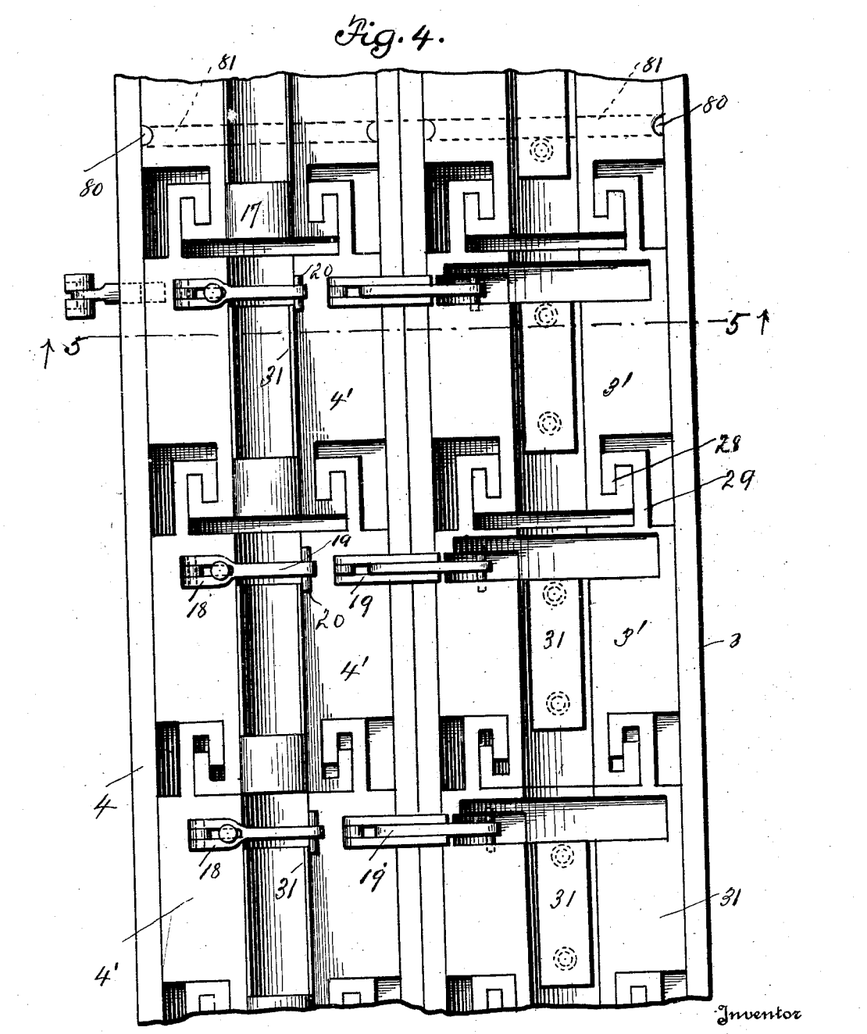
Fig. 4 is a view in elevation of a portion of the chute in open position.
Figure 5:
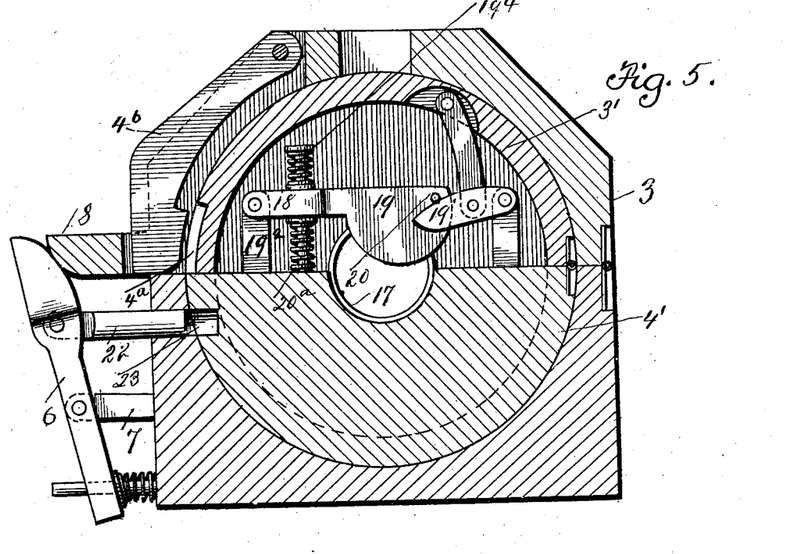
Fig. 5 is a transverse section on the line 5—5 of Fig. 4, the chute being closed.
Figure 6:
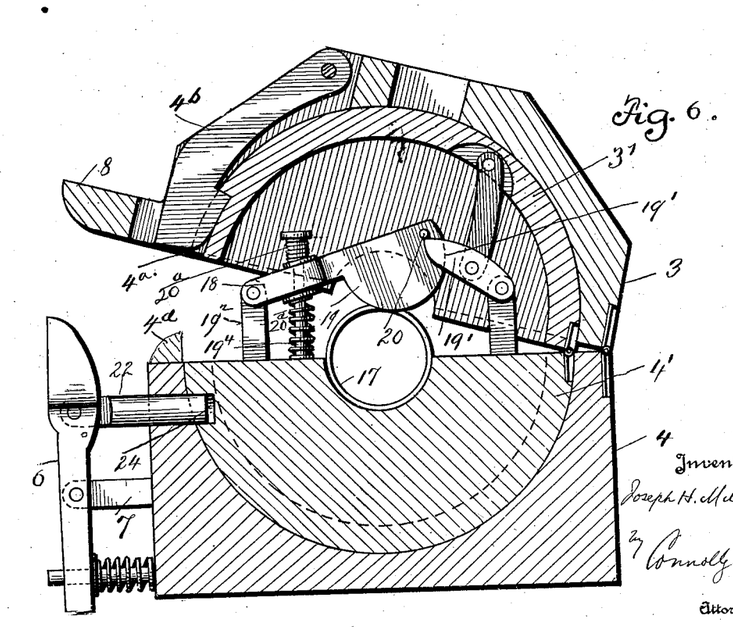
Fig. 6 is a similar section, the chute being open.
Figure 7:
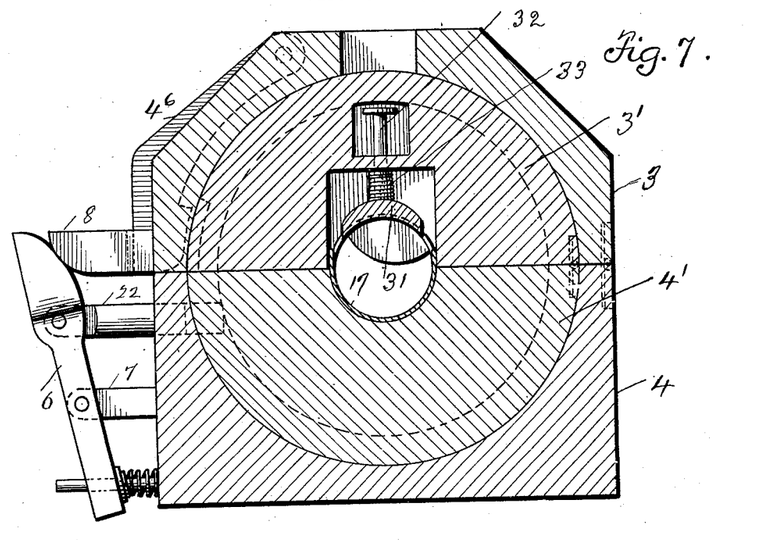
Fig. 7 is a transverse section through the chute on the line 6—6 of Fig. 2, the chute being closed.
Figure 8:
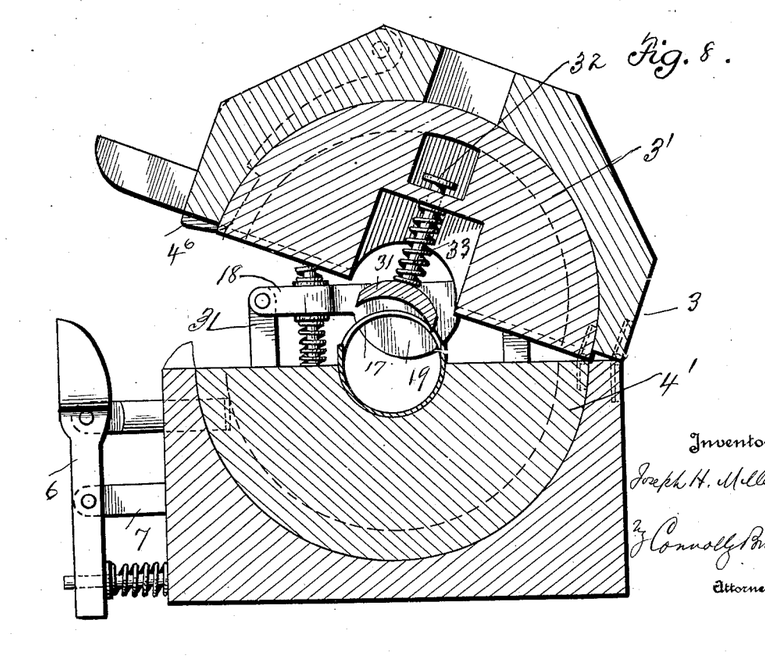
Fig. 8 is a similar section on the line 6—6, the chute being open.
Figure 9:
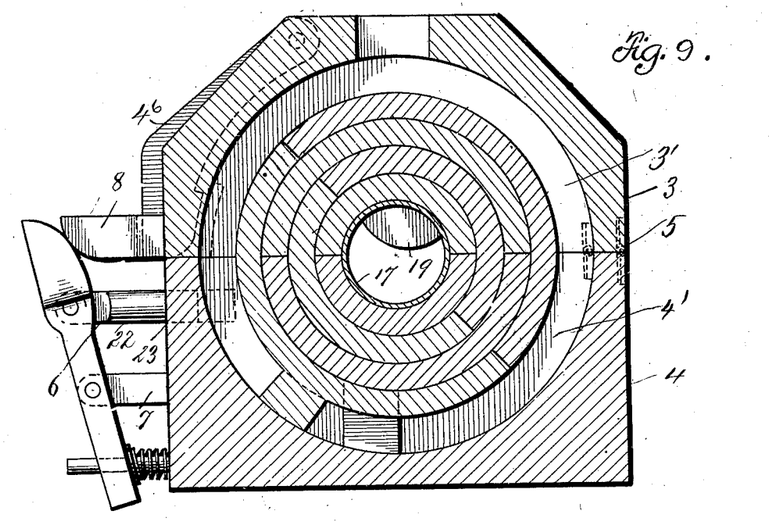
Figs. 9 and 10 are transverse sectional views of the line 2—2 of Fig. 2.
Figure 10:
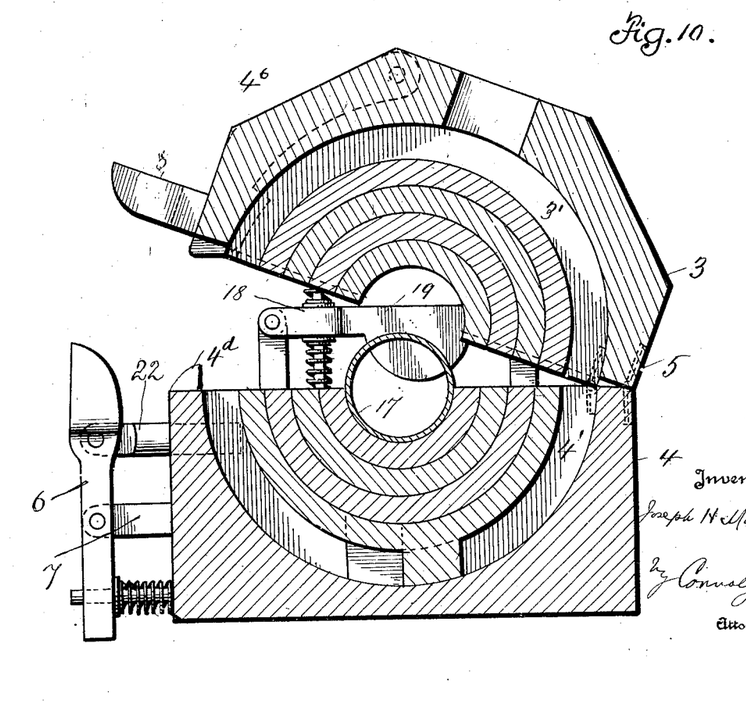
Figures 10, 11, 11A:
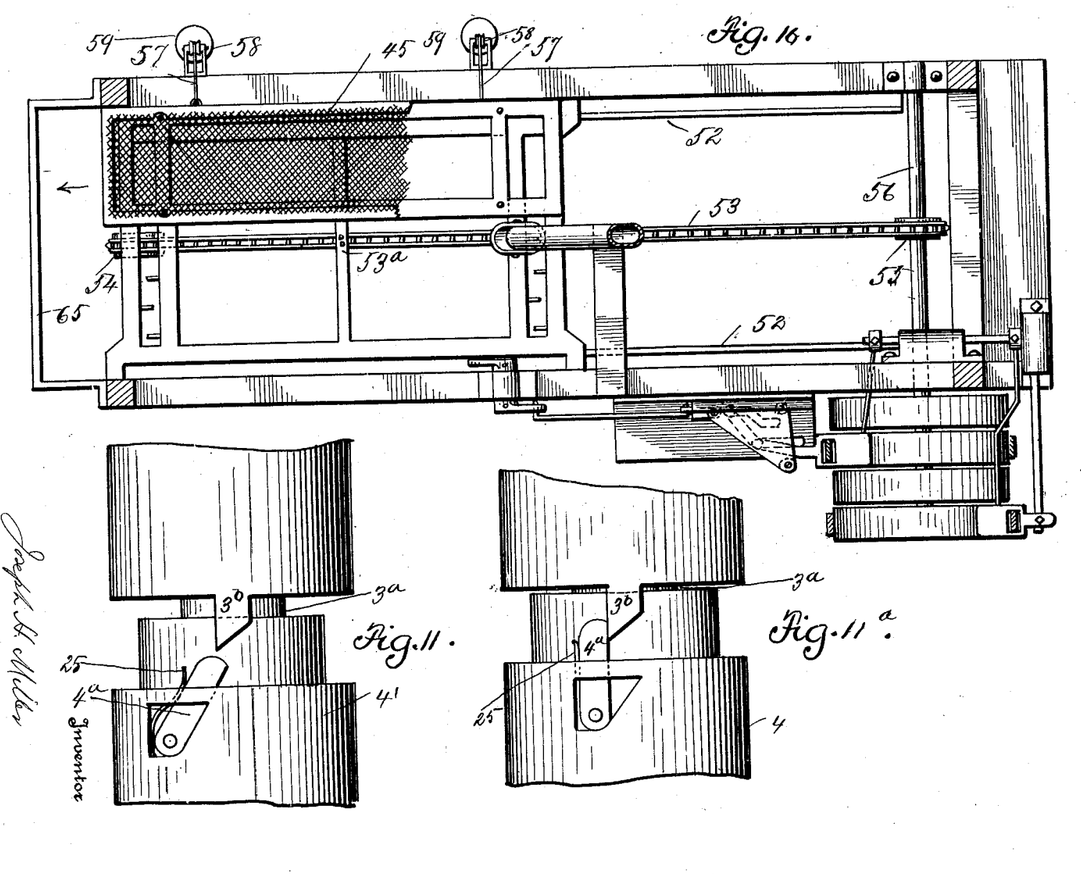
Figures 12, 13, 14, 15, 17:
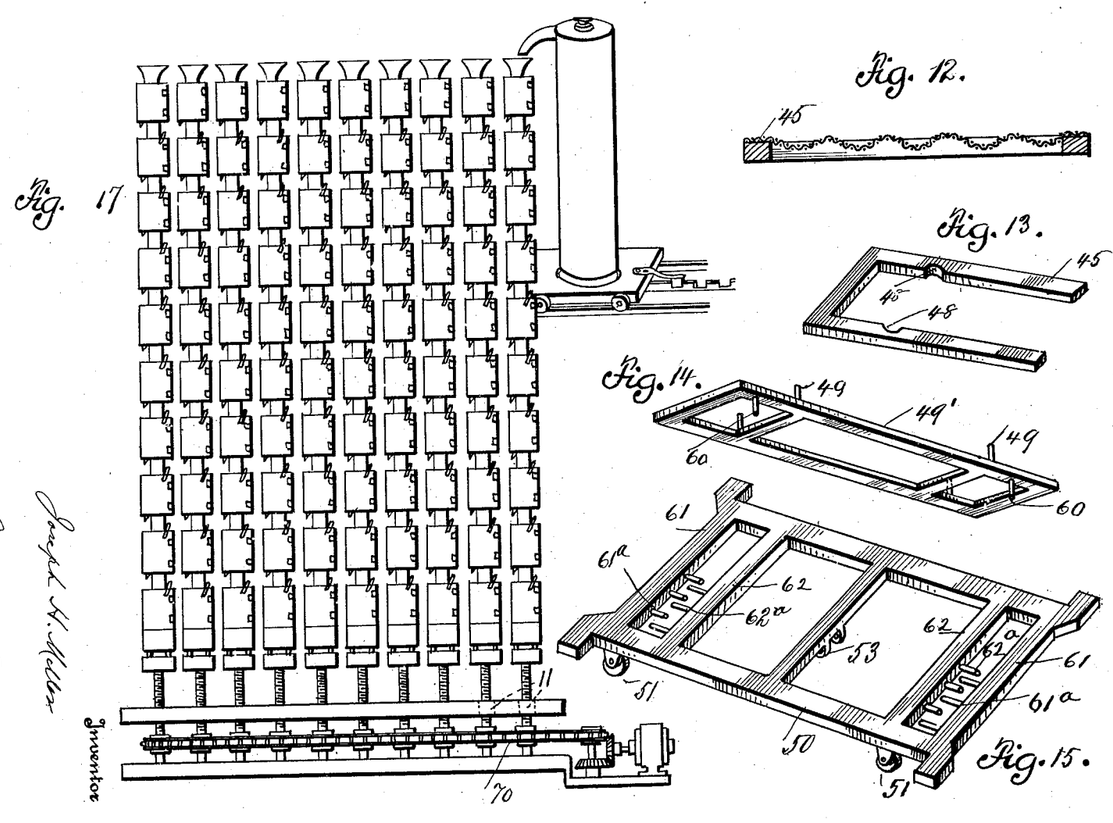
Fig. 12 is a cross sectional view of the receiving tray.
Fig. 13 is a perspective view of part of the same.
Fig. 14 is a perspective view of the tray-holding frame.
Fig. 15 is a perspective view of the reciprocating tray carrier.
Fig 17 is a diagrammatic view of the equipment for the use of a plurality of sausage linking units.

Fig. 17 of the drawings illustrates an ideal arrangement for this purpose, in which the several chutes are arranged in parallel order, and their twisting drums operated through the medium of a sprocket chain 70, engaging with sprocket wheels on the drum operating threaded shafts.

The sprocket chain is formed of links having wide spaces for the vertical travel of the shafts, and is driven by any suitable or convenient power.

The number of the units may be multiplied indefinitely and their use in the linking of a large number of sausages at one time enhances the economical value of the machine by reason of its increased output.

I claim:—

1. A sausage link forming machine of the character described, comprising a chute a series of axially aligned rotatable drums mounted therein and adapted for the passage therethrough of stuffed sausage cord in unlinked lengths, said drums being arranged and adapted to be moved into consecutive engagement with each other, and being provided with means for compressing the sausage stock at definite intervals to produce twistable neck portions and with means for simultaneously rotating a drum and moving it axially into engagement with an adjacent succeeding drum, the engaging means being such that one drum rotates sufficiently to produce a complete twist in the neck portion of its contained link, prior to its engagement with an idle drum.

2. In a sausage link forming machine of the character described, a chute, a series of neck twist producing drums mounted therein in axial alignment, and arranged and adapted to be rotated and moved axially, said drums being associated with means for imparting rotary motion thereto in successive order, and for moving a rotary drum axially into operative engagement with a succeeding idle drum to impart rotary motion to the latter.

3. In a machine of the character described, a series of rotary and axially movable drums, composed each of two sections of semi-cylindrical forms, hinged together at one side and arranged and adapted to be opened and closed, said drums being coupled together in axial alignment and successive order, and having expansible and contractable connecting means, whereby the drums may be moved consecutively into contracted and expanded positions, and whereby the drums may be clutched together, when brought in close axial relation and unclutched, when moved in an opposite direction.

4. In a machine of the character described, and as recited in claim 3, the coupling means for the drums comprising joint members which will permit individual, independent, rotation of each drum.

5. The combination with a sausage linking machine having an outlet for the escape of the sausages, of a spout for the passage of the same, and a receiving tray, the latter being detachably mounted on a reciprocating carrier and associated with means for shifting the tray laterally and horizontally at each end of the path of the carrier, whereby the sausages may be deposited on the tray in parallel rows.

6. In a sausage linking machine as specified in claim 5, automatic means for the reciprocation of the carrier operable through the movement of the latter.

JOSEPH H. MILLER.